United States Patent
Makimura et al.

(10) Patent No.: US 7,365,498 B2
(45) Date of Patent: Apr. 29, 2008

(54) ELECTRODELESS DISCHARGE LAMP LIGHTING DEVICE AND LUMINAIRE

(75) Inventors: Shinji Makimura, Kitakatsuragi-gun (JP); Hiroshi Kido, Hirakata (JP); Shingo Masumoto, Hirakata (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 191 days.

(21) Appl. No.: 10/577,717

(22) PCT Filed: Nov. 25, 2004

(86) PCT No.: PCT/JP2004/017451

§ 371 (c)(1),
(2), (4) Date: May 2, 2006

(87) PCT Pub. No.: WO2005/053364

PCT Pub. Date: Jun. 9, 2005

(65) Prior Publication Data

US 2007/0132399 A1    Jun. 14, 2007

(30) Foreign Application Priority Data

Nov. 25, 2003    (JP) .............................. 2003-394685

(51) Int. Cl.
*H05B 41/36* (2006.01)
(52) U.S. Cl. .................. 315/219; 315/224; 315/209 R; 315/248; 315/308
(58) Field of Classification Search ................ 315/308, 315/307, 209 R, 219, 244, 246–248, 224, 315/291, DIG. 7
See application file for complete search history.

(56) References Cited

U.S. PATENT DOCUMENTS

| 5,962,987 | A | * | 10/1999 | Statnic | 315/248 |
| 6,160,362 | A |   | 12/2000 | Shone et al. | 315/308 |
| 6,222,327 | B1 | * | 4/2001 | Shoji et al. | 315/291 |
| 6,906,473 | B2 | * | 6/2005 | Alexandrov | 315/224 |
| 7,064,494 | B2 | * | 6/2006 | Miyazaki et al. | 315/219 |

FOREIGN PATENT DOCUMENTS

| JP | 6-76971 | 3/1994 |
| JP | 8-45684 | 2/1996 |
| JP | 2001-515650 | 9/2001 |
| JP | 2001-338789 | 12/2001 |
| JP | 2003-332089 | 11/2003 |
| JP | 2003-332090 | 11/2003 |

* cited by examiner

*Primary Examiner*—Thuy V. Tran
*Assistant Examiner*—Ephrem Alemu
(74) *Attorney, Agent, or Firm*—Edwards Angell Palmer & Dodge LLP

(57) ABSTRACT

Electrodeless discharge lamp lighting device. Start circuit 19 sweeps operating frequency of resonance circuit 16 from start frequency to end frequency of resonance frequency side through drive circuit 18 and DC/AC conversion circuit 15, and starts electrodeless discharge lamp 13. Control circuit 10 increases or decreases variable power into circuit 18 so that detection current comes to equal prescribed current for shifting the operating frequency to middle range frequency between the start frequency and the end frequency. The prescribed current is set so that the detection voltage in case of the middle range frequency becomes lower than that in case of the end frequency. Capacitor 106 constituting integration circuit starts suppression of operation of circuit 10 when lamp 13 is started, and holds the suppression during at least start mode. Accordingly, it is possible to stably start lamp 13 and control stress on circuit(s) after lamp 13 is successfully started.

8 Claims, 14 Drawing Sheets

ELECTRODELESS DISCHARGE LAMP LIGHTING DEVICE AND LUMINAIRE

TECHNICAL FIELD

The invention relates to electrodeless discharge lamp lighting devices and luminaries.

BACKGROUND ART

An electrodeless discharge lamp lighting device is configured to generate high frequency power with a power amplifier to supply the high frequency power to an electrodeless discharge lamp through an induction coil, while there are different problems generated by fluctuation of a phase difference between voltage and (electric) current of the high frequency power. On account of this, various devices are suggested in which high frequency power supplied to an induction coil is preferably controlled.

For example, a prior art device described in Japanese Laid-open Patent Publication No. H6-76971 comprises an induction coil, a half bridge inverter constituting a power amplifier, a condenser divider for detecting high frequency square-wave voltage from an output point of the inverter to provide a detection voltage, and a current transformer for detecting a high frequency square-wave current from the above output point to provide a detection current. In this device, when a phase difference between the detection voltage and the detection current is reduced, a DC voltage applied to the inverter is lowered, whereas when the phase difference is expanded, the DC voltage is raised. When the phase difference is reduced, load impedance considerably falls, and therefore over-input to the inverter can be prevented by lowering the DC voltage.

A prior art device described in Japanese Laid-open Patent Publication No. H8-45684 comprises an induction coil, a half bridge inverter constituting a power amplifier, a transformer for detecting voltage into each control terminal of the inverter to provide a detection voltage, and a current transformer for detecting high frequency square-wave current from an output point of the inverter to provide a detection current. In this device, when the detection voltage has a delayed phase as compared with the detection current, ON width of the square-wave is reduced while an operating frequency of the power amplifier is decreased. When the detection voltage has an advanced phase as compared with the detection current, ON width of the square-wave is expanded and also the operating frequency of the power amplifier is increased. According to this device, since a phase difference between voltage and current of the high frequency power is reduced, reactive current can be decreased.

When an electrodeless discharge lamp is started, start current flowing through an induction coil must be made larger as its operating frequency is lower. In order to start the electrodeless discharge lamp at every frequency within the operating frequency range, a target value of the start current is set to a current value obtained by adding a margin to the current required at the minimum frequency of the range. This case has a problem that the margin with respect to the maximum frequency of the range becomes too large.

This problem can be solved by a device described in Japanese Laid-open Patent Publication No. 2003-332090. The device comprises an induction coil, a power amplifier, a current transformer for detecting high frequency current from an output of the amplifier to provide a detection current and a F-V converter for detecting the power amplifier's drive frequency corresponding to an operating frequency, and also comprises a set point varying means and a control means. The set point varying means sets a target value of start current to a smaller value as a frequency detected with the F-V converter is higher. The control means controls the drive frequency so that the detection current comes to equal the value set by the set point varying means. According to the device, it is possible to reduce margins of the maximum frequency side in the above range.

DISCLOSURE OF THE INVENTION

Incidentally, in order to start an electrodeless discharge lamp successfully and stably by sweeping up a start voltage applied across an induction coil, a power amplifier is constructed with, for example, a DC/AC converter such as a half bridge inverter or the like, and a resonance circuit.

However, since the configuration requires sweeping down an operating frequency from a prescribed start frequency to a prescribed end frequency, there is a problem that large load is added to a circuit(s) depending on setting of the end frequency. Namely, the resonance circuit has a resonance characteristic in which a first resonance curve with a resonance peak at a prescribed resonance frequency in a start mode is shifted to a second resonance curve lower than the first resonance curve in a lighting mode. The start mode is a mode before the electrodeless discharge lamp lights, and the lighting mode is a mode while the electrodeless discharge lamp is lighting. On account of this, the resonance characteristic of the resonance circuit changes at a point in time at which the electrodeless discharge lamp is lit, and therefore when the end frequency is set near high voltage in the second resonance curve, large stress is added to a circuit(s). Also, if voltage of the end frequency in the second resonance curve is insufficient, the electrodeless discharge lamp has a problem of flame failure occurrence.

It is an object of the present invention to stably start an electrodeless discharge lamp and also control stress on a circuit(s) after the electrodeless discharge lamp is successfully started.

An electrodeless discharge lamp lighting device of the present invention comprises a DC/AC conversion circuit, a resonance circuit, an induction coil, a voltage detection circuit, a drive circuit, a start circuit, a current detection circuit, a control circuit and a suppression means. In response to a drive signal with a drive frequency, the DC/AC conversion circuit converts DC power into high frequency power with an operating frequency corresponding to the drive frequency. The resonance circuit has a resonance characteristic in which a first resonance curve with a resonance peak at a prescribed resonance frequency in a start mode is shifted to a second resonance curve lower than the first resonance curve in a lighting mode. The start mode is a mode before an electrodeless discharge lamp lights, and the lighting mode is a mode while the electrodeless discharge lamp is lighting. The resonance circuit also receives the high frequency power from the DC/AC conversion circuit and then provides high frequency power varying in response to the operating frequency based on the resonance characteristic. The induction coil generates high frequency electromagnetic field in response to the high frequency power provided by the resonance circuit, and then induces high frequency power to the electrodeless discharge lamp by applying the high frequency electromagnetic field to the electrodeless discharge lamp. The voltage detection circuit detects a voltage applied to the induction coil by the high frequency power from the resonance circuit and then provides a detection voltage. The drive circuit provides the DC/AC conversion circuit with the drive signal having the drive frequency while adjusting the drive frequency in response to variable power. When the electrodeless discharge lamp is started, the start circuit sweeps down or up the variable power so as to sweep the detection voltage while sweeping the operating frequency from a prescribed start frequency higher than the resonance frequency to a prescribed end frequency lower than the start frequency. The current detection circuit detects a current flowing through the resonance circuit to provide a detection current. The control circuit decreases or increases the variable power so that the detection current comes to equal a prescribed current for shifting the operating frequency to a middle range frequency between the start frequency and the end frequency. The prescribed current is set so that the detection voltage in case of the middle range frequency becomes lower than that in case of the end frequency. The suppression means starts suppression of the control circuit's operation when the electrodeless discharge lamp is started, and then holds the suppression during at least the start mode.

In this configuration, since voltage applied across the induction coil is swept up when the electrodeless discharge lamp is started, stable start and lighting of the electrodeless discharge lamp are possible. Also, in the lighting mode, the voltage applied across the induction coil is lowered than that of the end frequency, and therefore stress on a circuit(s) can be reduced.

Preferably, the control circuit comprises an error amplification circuit that increases or decreases a current of the variable power so that the detection current comes to equal the prescribed current, and the suppression means brings the current from the error amplification circuit to the drive circuit to zero or a prescribed level during at least the start mode. The drive circuit adjusts the drive frequency in response to increase or decrease of the current of the variable power. The starting circuit sweeps down or up the current of the variable power so as to sweep the detection voltage while sweeping down the operating frequency from the start frequency to the end frequency. According to this configuration, it is possible to constitute each circuit not depending on a microcomputer.

Preferably, the error amplification circuit comprises an operational amplifier with a non-inverting input terminal, an inverting input terminal and an output terminal, and the suppression means constitutes an integration circuit that is connected between one input terminal of the input terminals and the output terminal. The operational amplifier receives a reference voltage equivalent to the prescribed current and a detection voltage equivalent to the detection current at the input terminals, and then increases or decreases the current of the variable power so that the detection voltage equivalent to the detection current comes to equal the reference voltage. The integration circuit has a time constant that is set to a value greater than a value equivalent to a period of time of at least the start mode. In this configuration, since the operational amplifier substantially operates after the electrodeless discharge lamp is lit, stable start and lighting of the electrodeless discharge lamp are possible.

Preferably, the error amplification circuit comprises an operational amplifier with a non-inverting input terminal, an inverting input terminal and an output terminal, and the suppression means adjusts the reference voltage so that an output current of the operational amplifier substantially comes to equal zero during at least the start mode. The operational amplifier receives a reference voltage equivalent to the prescribed current and a detection voltage equivalent to the detection current at the input terminals, and then increases the current of the variable power so that the detection voltage equivalent to the detection current comes to equal the reference voltage after the suppression means releases the suppression. In this configuration, since the start circuit operates during at least the start mode, stable start and lighting of the electrodeless discharge lamp are possible.

The drive circuit may be substantially controlled with only the control circuit after the operating frequency reaches the end frequency. In this case, control of the control circuit in the lighting mode becomes simple.

The end frequency may be set to a frequency in proximity to a peak of the second resonance curve. In this case, it is possible to preferably set the sweep range between the start frequency and the end frequency so as to cope with environmental changes such as ambient temperature or the like.

Preferably, the starting circuit comprises a sweep circuit and an operational amplifier. The sweep circuit provides a sweep voltage sweeping up or down from a point in time at which the electrodeless discharge lamp is started. The operational amplifier has a non-inverting input terminal, an inverting input terminal and an output terminal. The amplifier also receives the detection voltage from the voltage detecting circuit and the sweep voltage at the input terminals, and then decreases or increases the current of the variable power so that the detection voltage comes to equal the sweep voltage. In this configuration, stable start and lighting of the electrodeless discharge lamp come to be possible.

A luminaire of the present invention comprises the above electrodeless discharge lamp lighting device and the above electrodeless discharge lamp.

According to the present invention, it is possible to stably start the electrodeless discharge lamp and also control stress on a circuit(s) after the electrodeless discharge lamp is successfully started.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
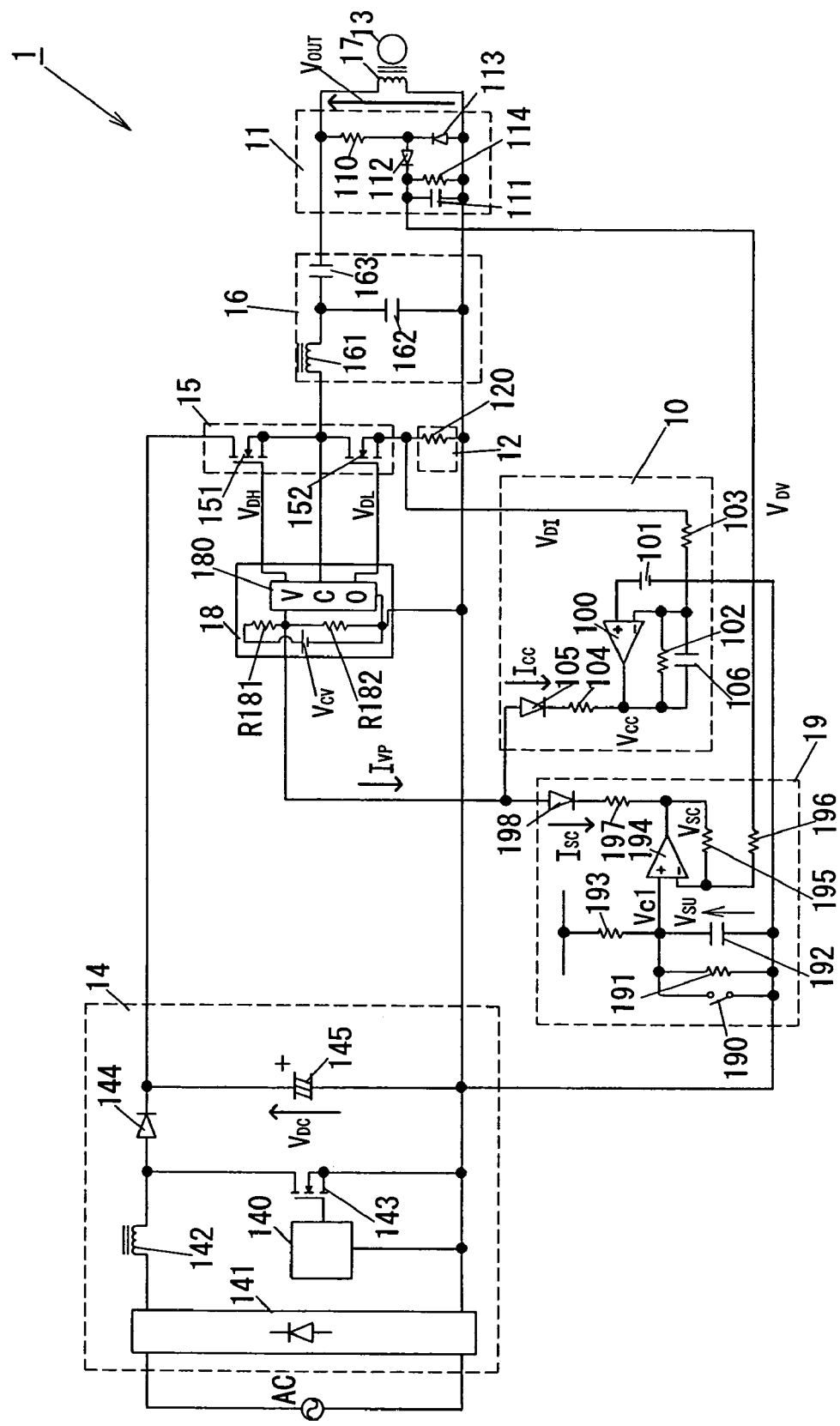
FIG. 1 is a circuit diagram of a first embodiment of an electrodeless discharge lamp lighting device according to the invention.

FIG. 1 shows a first embodiment of an electrodeless discharge lamp lighting device 1 according to the invention.

The electrodeless discharge lamp lighting device 1 is mounted on a luminaire (not shown) equipped with an electrodeless discharge lamp 13. The electrodeless discharge lamp lighting device 1 comprises a DC power source 14, a DC/AC conversion circuit 15, a resonance circuit 16, an induction coil 17, a drive circuit 18 and a start circuit 19 as well as the device described in Japanese Laid-open Patent Publication No. 2003-332090. The electrodeless discharge lamp lighting device 1 further comprises a voltage detection circuit 11, a current detection circuit 12 and a control circuit 10 as a characteristic of the embodiment.

The electrodeless discharge lamp 13 comprises a bulb such as a transparent glass bulb, a transparent glass sphere, a glass bulb with phosphor coating applied to its inner surface, a glass sphere with phosphor coating applied to its inner surface or the like. The lamp 13 also seals discharge gas such as inert gas, metal vapor and so on (e.g., mercury vapor and rare gas) into the bulb.

The DC power source 14 is constructed by, for example, a voltage step up converter so as to convert AC power from an alternating current power source AC into DC power to supply the DC power to the DC/AC conversion circuit 15. The converter comprises a rectifier 141, an inductor 142, a switching element 143 located through the inductor 142 on the low side between both output terminals of the rectifier 141, a diode 144, and a smooth capacitor 145 located through the diode 144 in the forward direction on the low side between both ends of the switching element 143. In addition, the converter comprises a drive circuit 140. The circuit 140 controls ON/OFF state of the switching element 143 so that output (DC voltage $V_{DC}$) of the voltage step up converter comes to equal a prescribed output while detecting the output.

The DC/AC conversion circuit 15 is constructed by, for example, a half bridge inverter so as to convert the DC power from the DC power source 14 into high frequency power in response to a drive signal with a drive frequency. The high frequency power has an operating frequency (e.g., 10s KHz to 100s MHz) corresponding to the drive frequency. The inverter is constructed with a switching element (e.g., FET) 151 and a switching element (e.g., FET) 152 located through the switching element 151 on the low side between both output terminals of the DC power source 14. The switching elements 151 and 152 alternately turn on and off in response to square-pulse shaped drive signal of $V_{DH}$ and $V_{DL}$ from the drive circuit 18. There is about $180_0$ phase difference between the drive signal $V_{DH}$ into the switching element 151 and the drive signal $V_{DL}$ into the switching element 152.

Figure 2:
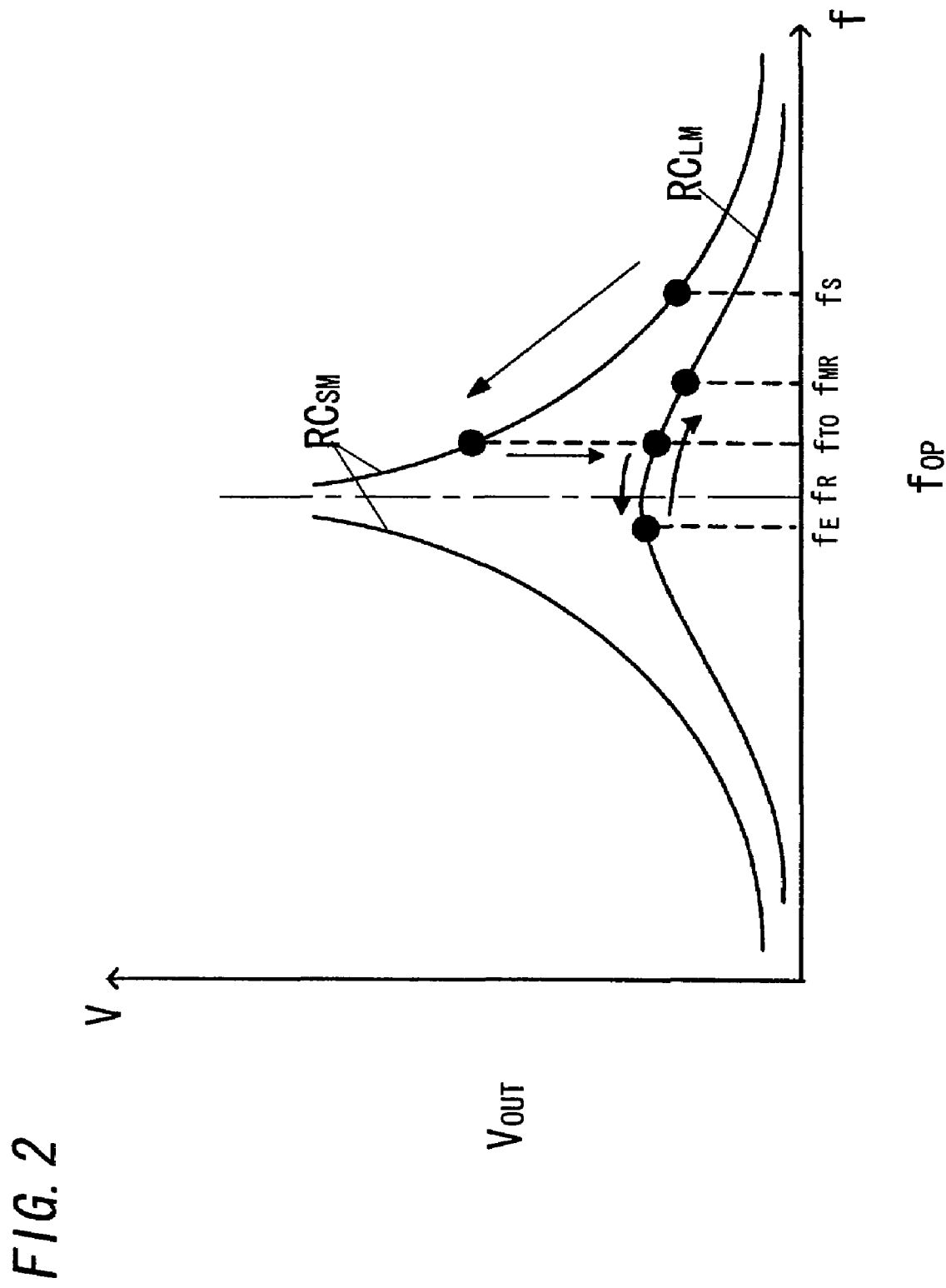
FIG. 2 is a diagram showing a resonance characteristic of the electrodeless discharge lamp lighting device of FIG. 1.

As shown in FIGS. 1 and 2, the resonance circuit 16 is configured to have a resonance characteristic in which a resonance curve $RC_{SM}$ with a resonance peak at a prescribed resonance frequency $f_R$ in a start mode is shifted to a resonance curve $RC_{LM}$ lower than the resonance curve $RC_{SM}$ in a lighting mode. The start mode is a mode before the electrodeless discharge lamp 13 lights, and the lighting mode is a mode while the electrodeless discharge lamp 13 is lighting.

For example, the resonance circuit 16 comprises an inductor 161 and a capacitor 162 located through the inductor 161 on the low side between both ends of the switching element 152. The circuit 16 also receives the high frequency power from the DC/AC conversion circuit 15 and then provides the induction coil 17 with high frequency power varying in response to the operating frequency $f_{OP}$ based on the resonance characteristic. The resonance circuit 16 further comprises a capacitor 163 that is combined with the capacitor 162 to construct a matching circuit.

The induction coil 17 is located in proximity to the electrodeless discharge lamp 13 so as to: generate high frequency electromagnetic field in response to the high frequency power provided through the resonance circuit 16; and induce high frequency power to the electrodeless discharge lamp 13 by applying (linking) the high frequency electromagnetic field to the electrodeless discharge lamp 13. Thereby, the electrodeless discharge lamp 13 generates high frequency plasma current within the bulb and then radiates ultraviolet rays or visible rays.

The drive circuit 18 is constructed by, for example, a VCO (voltage-controlled oscillator) or the like so as to provide the drive signal of $V_{DH}$ and $V_{DL}$ having the drive frequency to the DC/AC conversion circuit 15 while adjusting the drive frequency in response to current $I_{VP}$ of variable power into the start circuit 19 and the control circuit 10. For example, the drive circuit 18 comprises a resistor 181 connected between a constant voltage source $V_{CV}$ and an output of the start circuit 19, a resistor 182 connected between the resistor 181 and a negative terminal of the DC power source 14, and the VCO 180 that receives a voltage across the resistor 182 as an input voltage, and adjusts the drive frequency in response to a voltage drop across the resistor 182. Namely, the drive circuit 18 raises the input voltage of the VCO by an increased voltage drop to raise the drive frequency of the drive signal of $V_{DH}$ and $V_{DL}$. The drive circuit 18 also lowers the input voltage of the VCO by a decreased voltage drop to lower the drive frequency of the drive signal of $V_{DH}$ and $V_{DL}$. Since a constant voltage of the above constant voltage source is a voltage defining a start frequency $f_S$, the constant voltage is set based on a desired start frequency $f_S$.

The start circuit 19 is configured to sweep down the current $I_{VP}$ of the variable power so as to sweep up a detection voltage $V_{DV}$ from the voltage detection circuit 11 while sweeping down the operating frequency $f_{OP}$ from a prescribed start frequency $f_S$ to a prescribed end frequency $f_E$, when the electrodeless discharge lamp 13 is started. The frequency $f_S$ is higher than the resonance frequency $f_R$ and the frequency $f_E$ is lower than the start frequency $f_S$. However, not limited to this, when the drive circuit 18 is configured to respectively lower or raise the input voltage into the VCO in response to increase or decrease of the current $I_{VP}$, the start circuit 19 may be configured to sweep up the current $I_{VP}$.

For example, the start circuit 19 comprises a sweep-up circuit constructed with a switch 190, a reference resistor 191, a capacitor 192 and a thermal sensitive resistor 193, and further comprises an error amplification circuit constructed with an OP amp (operational amplifier) 194, a feedback resistor 195, an input resistor 196, an output resistor 197 and a diode 198.

The switch 190 is connected in parallel with the reference resistor 191 and the capacitor 192, while the parallel combination of switch 190, reference resistor 191 and capacitor 192 is connected in series with the thermal sensitive resistor 193. The series combination of reference resistor 191 and thermal sensitive resistor 193 receives a DC voltage through a voltage regulator or directly from the DC power source 14. In this state, when the switch 190 is turned off, the capacitor 192 applies a voltage to a non-inverting input terminal of the OP amp 194, and also sweeps up the voltage up to a reference voltage across the reference resistor 191 at a time constant given by mainly the capacitor 192 and the thermal sensitive resistor 193. The thermal sensitive resistor 193 corrects the reference voltage across the reference resistor 191 in response to an ambient temperature. Since the reference voltage across the reference resistor 191 is a voltage defining the end frequency $f_E$, the reference voltage is set based on a desired end frequency $f_E$.

The feedback resistor 195 is connected between an inverting input terminal of the OP amp 194 and its output terminal. The input resistor 196 is connected between the inverting input terminal and an output of the voltage detection circuit 11. The output resistor 197 is connected between the output terminal of the OP amp 194 and an input of the drive circuit 18. The diode 198 is connected between the output resistor 197 and the input of the drive circuit 18, while its cathode is connected with the output resistor 197. The error amplification circuit sweeps up its output voltage $V_{SC}$ from the voltage of 0V to a voltage corresponding to the reference voltage across the reference resistor 191 so that the detection voltage $V_{DV}$ from the voltage detection circuit 11 comes to equal a sweep-up voltage $V_{SU}$ across the capacitor 192. Accordingly, since a potential difference between the constant voltage in the drive circuit 18 and the output voltage $V_{SC}$ of the error amplification circuit sweeps down, an output current $I_{SC}$ of the error amplification circuit sweeps from a prescribed start current corresponding to the start frequency $f_S$ to a prescribed end current corresponding to the end frequency $f_E$. A sweep range of the output voltage $V_{SC}$ is set to a range that includes an output voltage $V_{SC}$ corresponding to an output voltage $V_{OUT}$ required for the start of the electrodeless discharge lamp 13.

The voltage detection circuit 11 is located in proximity to the induction coil 17 so as to: detect the voltage $V_{OUT}$ applied to the induction coil 17 by the high frequency power from the resonance circuit 16; and then provide the detection voltage $V_{DV}$.

The voltage detection circuit 11 is constructed with, for example, a resistor 110, a capacitor 111, diodes 112 and 113, and a discharge resistor 114. The resistor 110 and the capacitor 111 constitute an RC integration circuit, and receive the voltage $V_{OUT}$ to provide the detection voltage $V_{DV}$. The diodes 112 and 113 constitute a half-wave rectification circuit, and convert the voltage $V_{OUT}$ into a half-wave voltage to apply it across the capacitor 111. The discharge resistor 114 discharges the capacitor 111 at a time constant given by the capacitor 111 and the discharge resistor 114.

The current detection circuit 12 is constructed with, for example, a resistor 120 connected between a source of the switching element 152 and the negative terminal of the DC power source 14 so as to detect a resonance current flowing through the resonance circuit 16 to provide a detection voltage $V_{DI}$ showing a detection current.

The control circuit 10 is configured to increase or decrease the current $I_{VP}$ of the variable power so that the detection current showed by the detection voltage $V_{DI}$ comes to equal a prescribed current for shifting the operating frequency $f_{OP}$ to a prescribed middle range frequency $f_{MR}$ between the start frequency $f_S$ and the end frequency $f_E$. The prescribed current is: set to a value corresponding to a rating current of the electrodeless discharge lamp 13; and also set so that the detection voltage $V_{DV}$ in case of the middle range frequency $f_{MR}$ is lower than the detection voltage $V_{DV}$ in case of the end frequency $f_E$.

For example, the control circuit 10 comprises an error amplification circuit constructed with an OP amp 100, a reference power source 101, a feedback resistor 102, an input resistor 103, an output resistor 104 and a diode 105, and further comprises a capacitor 106 that is combined with the feedback resistor 102 to construct an integration circuit.

The reference power source 101 applies a reference voltage for setting the middle range frequency $f_{MR}$ to a non-inverting input terminal of the OP amp 100. The feedback resistor 102 is connected between an inverting input terminal of the OP amp 100 and its output terminal. The input resistor 103 is connected between the inverting input terminal and the source of the switching element 152. The output resistor 104 is connected between the output terminal of the OP amp 100 and the input of the drive circuit 18. The diode 105 is connected between the output resistor 104 and the input of the drive circuit 18, while its cathode is connected with the output resistor 104.

The capacitor 106 is connected in parallel with the feedback resistor 102. A time constant of the integration circuit including the capacitor 106 is set to a value for substantially delaying an effective output of the error amplification circuit in the control circuit 10 up to a prescribed point in time t3 (cf. FIG. 3) after the electrodeless discharge lamp 13 is lit. Concretely, the capacitor 106 is set to a value by which: a voltage $V_{CC}$ provided from the control circuit 10 becomes higher than the constant voltage in the drive circuit 18 until sweep up of the above sweep-up circuit is completed; and also a voltage $V_{CC}$ provided from the control circuit 10 comes to equal the constant voltage in the drive circuit 18 at the prescribed point in time t3 after the sweep up of the sweep-up circuit is completed.

In short, the control circuit 10 substantially operates at the point in time t3 after the electrodeless discharge lamp 13 is lit, and then increases or decreases the output voltage $V_{CC}$ so that the detection voltage $V_{DI}$ from the current detection circuit 12 comes to equal the reference voltage of the reference power source 101. When a potential difference between the constant voltage in the drive circuit 18 and the output voltage $V_{CC}$ of the control circuit 10 is increased, an output current $I_{CC}$ of the control circuit 10 is increased, whereas when the potential difference is decreased, the output current $I_{CC}$ is decreased.

Before the error amplification circuit of the control circuit 10 is substantially operated, the drive circuit 18 is controlled by the current $I_{VP}$ consisted of the output current $I_{SC}$. Accordingly, the drive circuit 18 sweeps the drive frequency of the drive signal of $V_{DH}$ and $V_{DL}$ from the frequency corresponding to the start frequency $f_S$ to the frequency corresponding to the end frequency $f_E$. After the error amplification circuit of the control circuit 10 is substantially operated, the drive circuit 18 is controlled by the current $I_{VP}$ obtained by adding the output current $I_{SC}$ and the output current $I_{CC}$. Accordingly, the drive circuit 18 sweeps the drive frequency of the drive signal of $V_{DH}$ and $V_{DL}$ from the frequency corresponding to the end frequency $f_E$ to the frequency corresponding to the middle range frequency $f_{MR}$.

Figure 3:
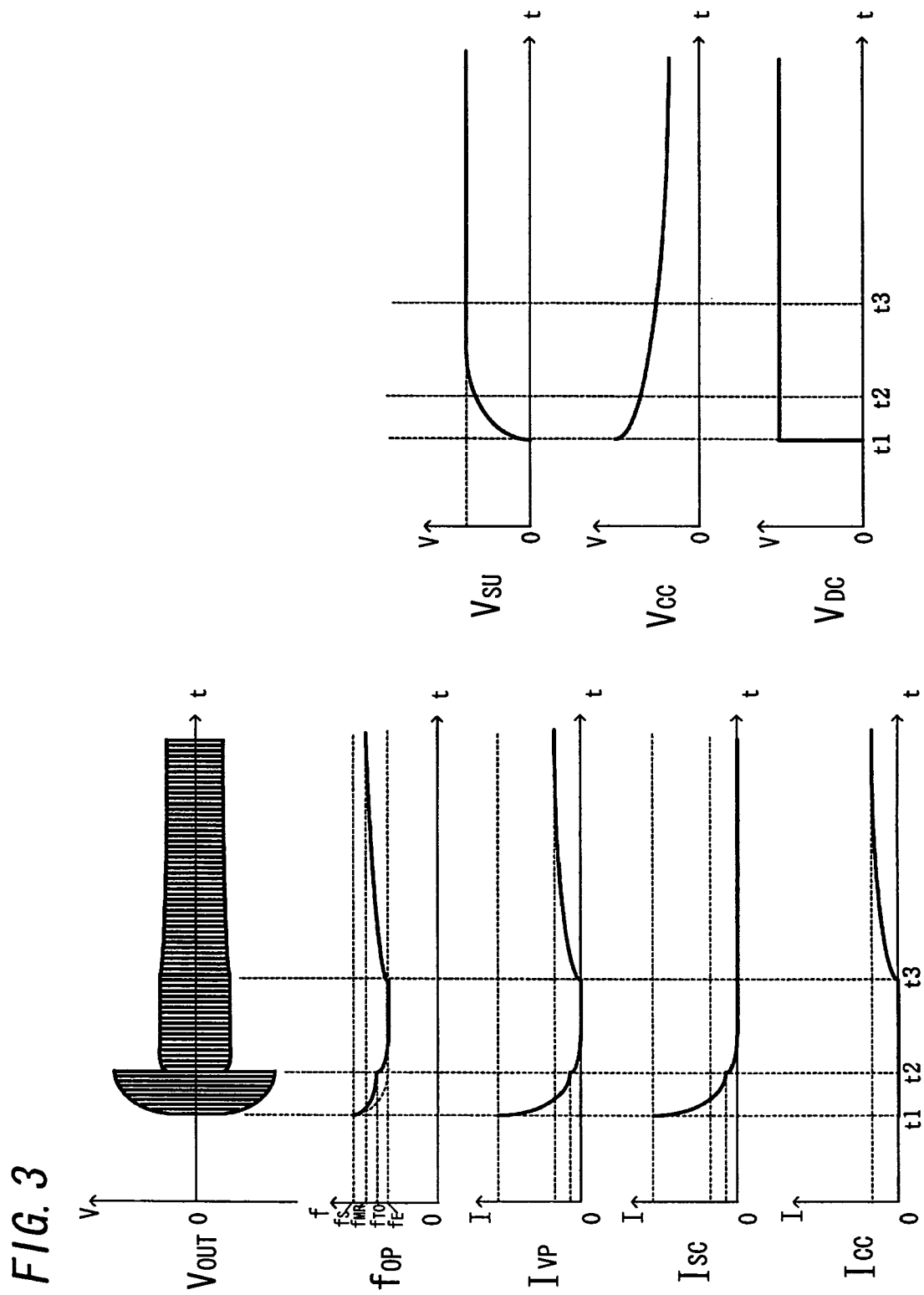
FIG. 3 is a timing chart showing an operation of the electrodeless discharge lamp lighting device of FIG. 1.

The operation of the electrodeless discharge lamp lighting device 1 is now explained with reference to FIG. 3. When the electrodeless discharge lamp lighting device 1 is started at a point in time t1 and the switch 190 is turned on at the same time, each of the voltage $V_{SU}$ across the capacitor 192 in the start circuit 19 and the detection voltage $V_{DV}$ of the voltage detection circuit 11 is 0V. Therefore, the drive circuit 18 provides the DC/AC conversion circuit 15 with the drive signal of $V_{DH}$ and $V_{DL}$ having the drive frequency corresponding to the start frequency $f_S$. Since the DC/AC conversion circuit 15 and the resonance circuit 16 then operate at the start frequency $f_S$, the resonance circuit 16 applies the voltage $V_{OUT}$ across the induction coil 17. The voltage $V_{OUT}$ corresponds to the start frequency $f_S$ in the resonance curve $RC_{SM}$.

The voltage $V_{SU}$ across the capacitor 192 is then swept up. Therefore, the drive circuit 18 sweeps the drive frequency of the drive signal of $V_{DH}$ and $V_{DL}$ from the frequency corresponding to the start frequency $f_S$ to the frequency corresponding to the end frequency $f_E$. In response to the sweep of the drive frequency, the DC/AC conversion circuit 15 and the resonance circuit 16 sweep the operating frequency $f_{OP}$ from the start frequency $f_S$ to the end frequency $f_E$. Thereby, since the resonance circuit 16 sweeps the voltage $V_{OUT}$ from the voltage corresponding to the start frequency $f_S$ to the voltage corresponding to the end frequency $f_E$, the electrodeless discharge lamp 13 can be lit during the sweep. FIG. 3 shows an example that the electrodeless discharge lamp 13 is successfully lit at t2. Also, $f_{TO}$ is a frequency when the electrodeless discharge lamp 13 is lit at t2.

When the electrodeless discharge lamp 13 is lit at t2, the resonance characteristic of the resonance circuit 16 is shifted from the resonance curve $RC_{SM}$ to the resonance curve $RC_{LM}$. Accordingly, the resonance circuit 16 lowers the voltage corresponding to the frequency $f_{TO}$ in the resonance curve $RC_{SM}$ to the voltage corresponding to the frequency $f_{TO}$ in the resonance curve $RC_{LM}$. Just then, since the detection voltage $V_{DV}$ of the voltage detection circuit 11 is lowered, the resonance circuit 16 then sweeps from a voltage corresponding to a frequency higher than the frequency $f_{TO}$ to the voltage corresponding to the end frequency $f_E$ in response to the sweep-up voltage $V_{SU}$ across the capacitor 192.

After this operation, the error amplification circuit in the control circuit 10 substantially operates at the point in time t3 after the electrodeless discharge lamp 13 is lit. Accordingly, the drive circuit 18 sweeps the drive frequency of the drive signal of $V_{DH}$ and $V_{DL}$ from the frequency corresponding to the end frequency $f_E$ to the frequency corresponding to the middle range frequency $f_{MR}$. Thereby, the resonance circuit 16 sweeps the voltage $V_{OUT}$ from the voltage corresponding to the start frequency $f_S$ to the voltage corresponding to the middle range frequency $f_{MR}$.

In this embodiment, since the error amplification circuit in the control circuit 10 substantially operates at the point in time t3 after the electrodeless discharge lamp 13 is lit, it is possible to stably start the electrodeless discharge lamp 13 through the start circuit 19. After the electrodeless discharge lamp 13 is lit, it is possible to limit a period of time in which the output of the resonance circuit 16 is excessive to a period of time from t2 to t3, and therefore stress on a circuit(s) can be controlled.

In an alternate embodiment, when the electrodeless discharge lamp 13 is lit at t2, a potential difference between the detection voltage $V_{DV}$ of the voltage detection circuit 11 and the output voltage $V_{SC}$ of the start circuit 19 becomes a voltage higher than the constant voltage in the drive circuit 18. In this case, after the voltage across the capacitor 192 of the start circuit 19 reaches the voltage corresponding to the end frequency $f_E$, the drive frequency of the drive circuit 18 is controlled with only the control circuit 10. Thereby, control of the control circuit 10 in the lighting mode can be simple.

Figure 4:
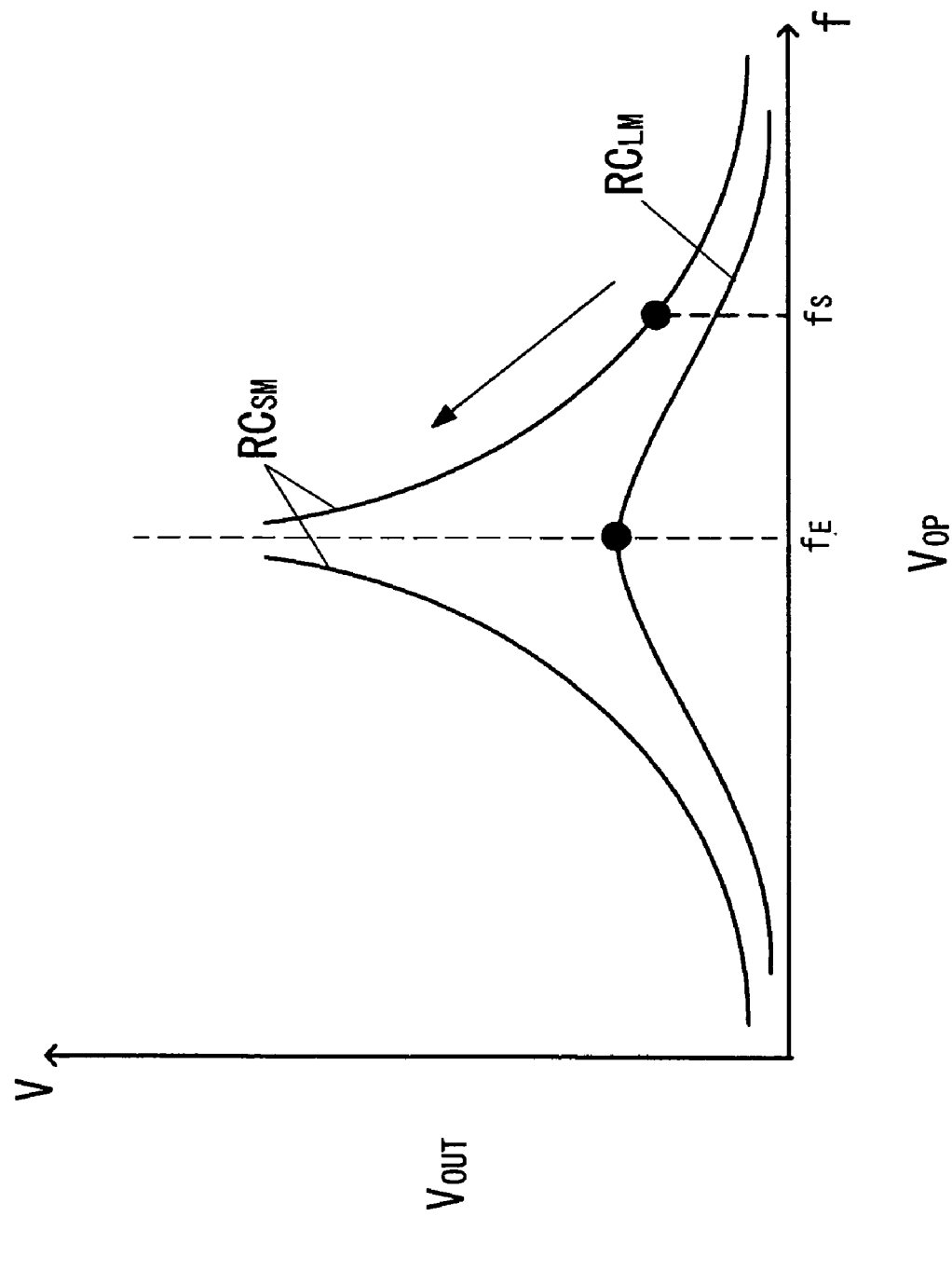
FIG. 4 is a diagram showing a resonance characteristic of an alternate embodiment with respect to the electrodeless discharge lamp lighting device of FIG. 1.

In another alternate embodiment, as shown in FIG. 4, the end frequency $f_E$ is set to a frequency in proximity to the resonance frequency $f_R$ in the resonance curve $RC_{SM}$ and the frequency of the resonance peak in the resonance curve $RC_{LM}$. In this case, it is possible to preferably set the sweep range between the start frequency $f_S$ and the end frequency $f_E$ so as to cope with environmental changes such as ambient temperature or the like. Since the end frequency $f_E$ in the resonance curve $RC_{LM}$ does not become lower than that of the resonance peak in the resonance curve $RC_{LM}$, the voltage $V_{OUT}$ corresponding to the end frequency $f_E$ can be made highest. Thereby, it is possible to prevent flame failure after the electrodeless discharge lamp 13 is lit.

Figure 5:
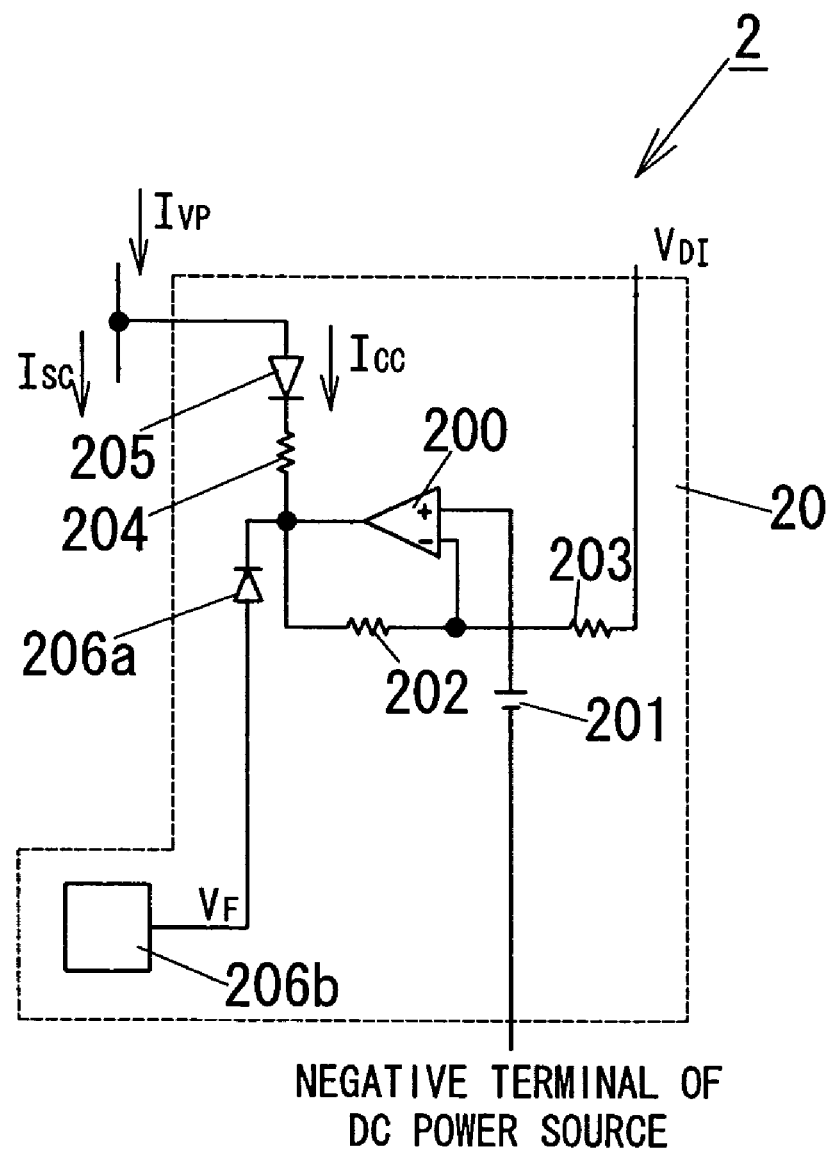
FIG. 5 is a circuit diagram showing a part of a second embodiment of an electrodeless discharge lamp lighting device according to the invention.

FIG. 5 shows a part of a second embodiment of an electrodeless discharge lamp lighting device 2 according to the invention.

The electrodeless discharge lamp lighting device 2 is characterized by a control circuit 20, and is different from the first embodiment in that the control circuit 20 further comprises a diode 206a and a clamp circuit 206b in stead of the capacitor 106.

The control circuit 20 comprises an OP amp 200, a reference power source 201, a feedback resistor 202, an input resistor 203, an output resistor 204 and a diode 205 as well as the first embodiment. A cathode of the diode 206a is connected to the output terminal of the OP amp 200, while its anode is connected to an output of the clamp circuit 206b. The diode 206a operates as a switch that receives a voltage $V_F$ from the clamp circuit 206b and applies the voltage $V_F$ to the output terminal of the OP amp 200 when the voltage $V_F$ is a high level.

Figure 6:
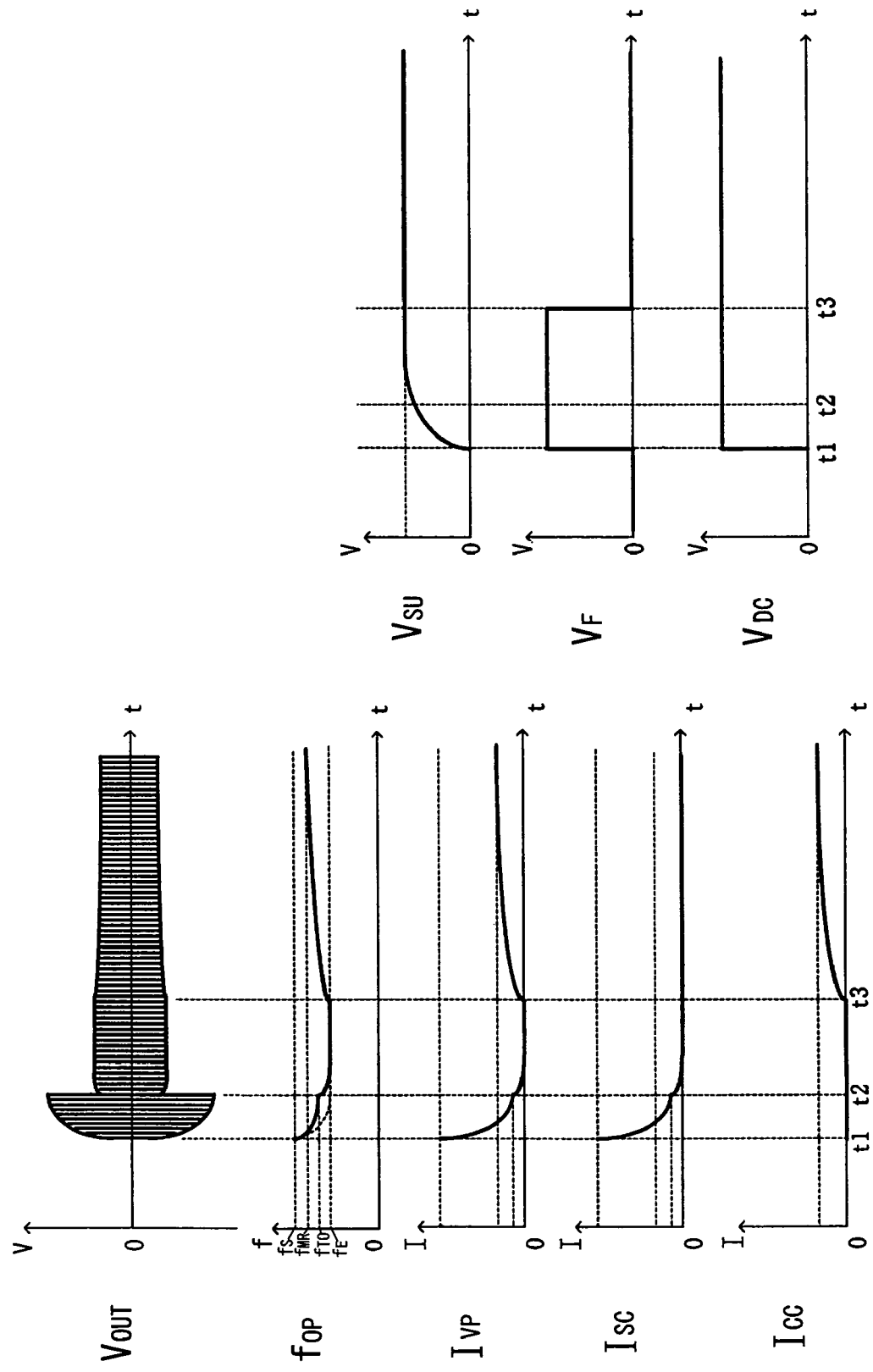
FIG. 6 is a timing chart showing an operation of the electrodeless discharge lamp lighting device of FIG. 5.

As shown in FIG. 6, the clamp circuit 206b is configured to provide the voltage $V_F$ at the High level equal to or more than the constant voltage in the drive circuit during a period of time from t1 to t3, and drop the voltage $V_F$ to a Low (zero) level after t3. Therefore, the error amplification circuit of the control circuit 20 comes to operate substantially at the prescribed point in time (t3) after the electrodeless discharge lamp is lit.

The operation of the control circuit 20 is now explained. When the electrodeless discharge lamp lighting device 2 is started at t1, the output of the control circuit 20 is fixed to the voltage $V_F$ of High level up to t3. Thereby, the output current $I_{CC}$ of the control circuit 20 is fixed to zero up to t3.

After the electrodeless discharge lamp is lit at t2, the clamp circuit 206b returns the voltage $V_F$ to 0V at t3 and the error amplification circuit in the control circuit 20 substantially starts operating at the same time. Thereby, the drive circuit sweeps the drive frequency of the drive signal of $V_{DH}$ and $V_{DL}$ from the frequency corresponding to the end frequency $f_E$ to the frequency corresponding to the middle range frequency $f_{MR}$.

In this embodiment, since the error amplification circuit in the control circuit 20 substantially operates at the point in time t3 after the electrodeless discharge lamp is lit, it is possible to stably start the electrodeless discharge lamp through the start circuit. After the electrodeless discharge lamp is lit, it is possible to limit a period of time in which the output of the resonance circuit is excessive to a period of time from t2 to t3, and therefore stress on a circuit(s) can be controlled. The operation of the error amplification circuit in the control circuit 20 can be stopped substantially and certainly during a desired period of time.

In an alternate embodiment, the clamp circuit 206b applies the voltage $V_F$ of High level to the output terminal of the OP amp 200 through the diode 206a during at least a period of time from t1 to t2, and then fixes the output of the control circuit 20 to the voltage $V_F$. The electrodeless discharge lamp lighting device 2 further comprises a timer for measuring the period of time. However, not limited to this, when the period of time is from t1 to t2, the electrodeless discharge lamp lighting device 2 may further comprise a circuit such as a detection circuit for detecting lighting of the electrodeless discharge lamp in order to detect t2, or the like. The lighting of the electrodeless discharge lamp can be detected by monitoring variation such as decrease of the detection voltage $V_{DV}$ of the voltage detection circuit or increase of the voltage $V_{SC}$ of the start circuit at t2, or the like.

Figure 7:
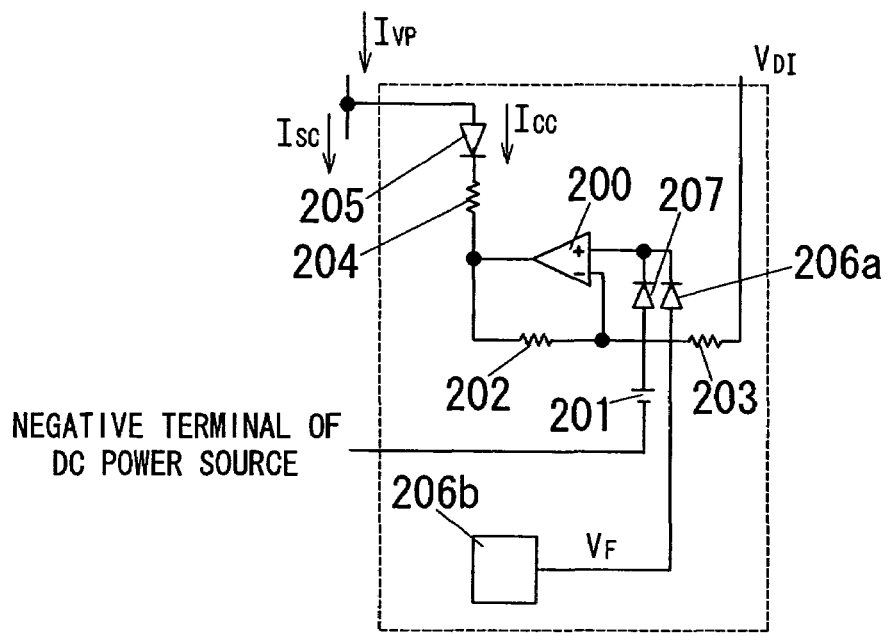
FIG. 7 is a circuit diagram showing a part of an alternate embodiment with respect to the electrodeless discharge lamp lighting device of FIG. 5.

In another alternate embodiment, the electrodeless discharge lamp lighting device 2 as shown in FIG. 7 further comprises a diode 207 connected between the reference power source 201 and the non-inverting input terminal of the OP amp 200. A cathode of the diode 207 is connected to the non-inverting input terminal of the OP amp 200. The cathode of the diode 206a is connected to the inverting input terminal of the OP amp 200, while its anode is connected to the output of the clamp circuit 206b. The diode 206a operates as a switch that receives the voltage $V_F$ from the clamp circuit 206b and applies the voltage $V_F$ to the output terminal of the OP amp 200 when the voltage $V_F$ is a High level. The High level of the voltage $V_F$ of the clamp circuit 206b is set to a level sufficiently higher than the reference voltage of the reference power source 201 so that the output current $I_{CC}$ becomes almost zero. In this case, the reference voltage of the reference power source 201 is adjusted through the clamp circuit 206b.

Figure 8:
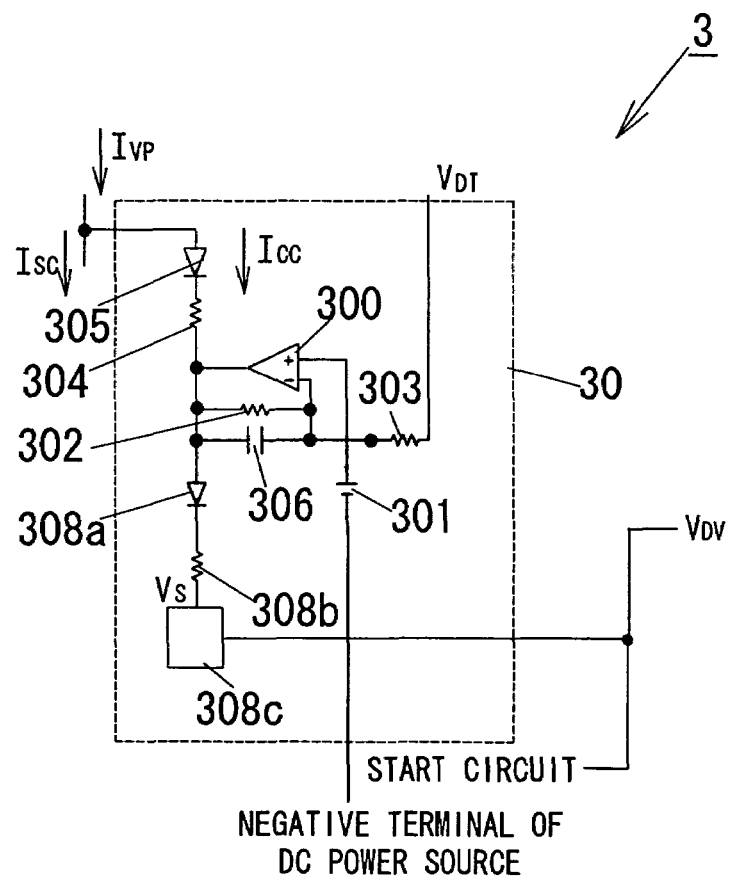
FIG. 8 is a circuit diagram showing a part of a third embodiment of an electrodeless discharge lamp lighting device according to the invention.

FIG. 8 shows a part of a third embodiment of an electrodeless discharge lamp lighting device 3 according to the invention.

The electrodeless discharge lamp lighting device 3 is characterized by a control circuit 30, and is different from the first embodiment in that the control circuit 30 further comprises a diode 308a, a resistor 308b and a lighting detection circuit 308c.

The control circuit 30 comprises an OP amp 300, a reference power source 301, a feedback resistor 302, an input resistor 303, an output resistor 304, a diode 305 and a capacitor 306 as well as the first embodiment. An anode of the diode 308a is connected to the output terminal of the OP amp 300, while its cathode is connected to an output of the lighting detection circuit 309 through the resistor 308b. The diode 308a operates as a switch that receives a voltage $V_S$ from the lighting detection circuit 308c through the resistor 308b and applies the voltage $V_S$ to the output terminal of the OP amp 300 when the voltage $V_S$ is a Low level.

Figure 9:
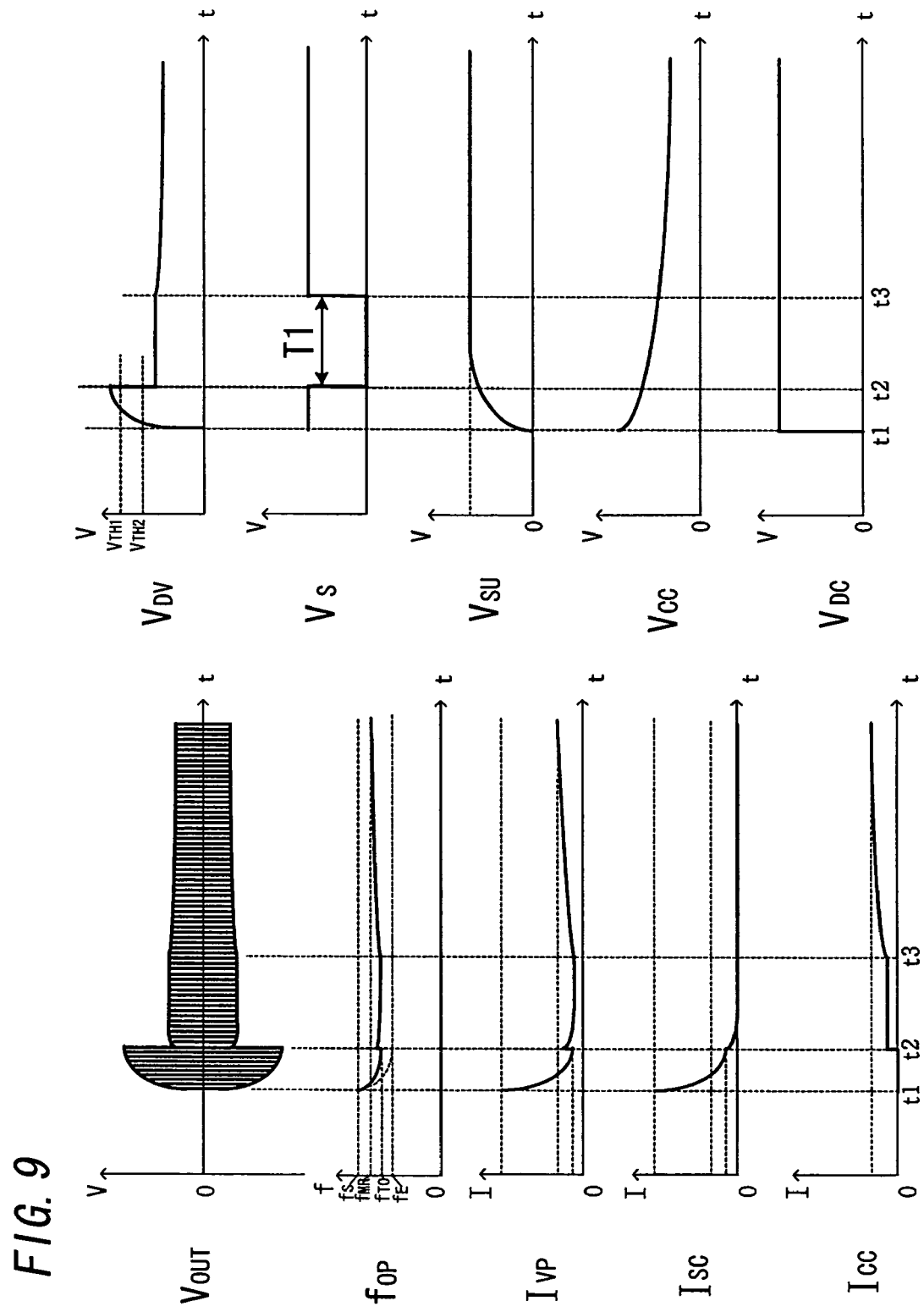
FIG. 9 is a timing chart showing an operation of the electrodeless discharge lamp lighting device of FIG. 8.
Figure 10:
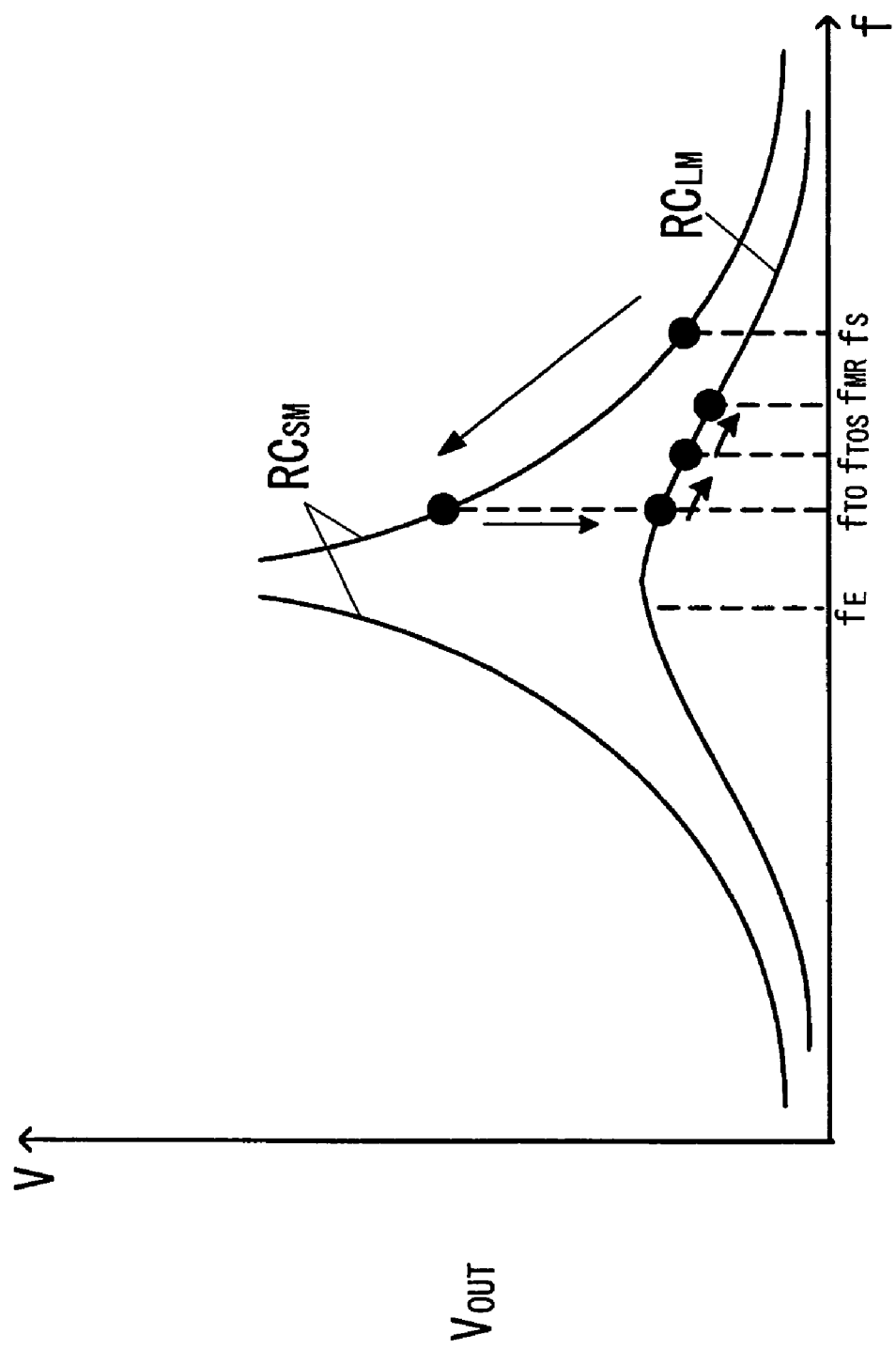
FIG. 10 is a diagram showing a resonance characteristic of the electrodeless discharge lamp lighting device of FIG. 8.

As shown in FIG. 9, the lighting detection circuit 308c is configured to: provide the voltage $V_S$ usually at a High level from t1; detect lighting of the electrodeless discharge lamp when the detection voltage $V_{DV}$ from the voltage detection circuit drops below prescribed threshold voltages $V_{TH1}$ and $V_{TH2}$ after previously exceeding them; and drop the voltage $V_S$ to the Low (zero) level during only a prescribed period of time T1 from time of the lighting. Namely, as shown in FIGS. 9 and 10, the lighting detection circuit 308c provides an output current $I_{CC}$ of a prescribed level at t2 to sift the frequency $f_{TO}$ to a prescribed higher frequency $f_{TOS}$. Thereby, it is possible to prevent the drive frequency $f_{OP}$ from reaching the end frequency $f_E$ after the electrodeless discharge lamp is successfully lit. The output current $I_{CC}$ during a period of time from t2 to t3 is set with the output resistor 304 and the resistor 308b. The High level of the voltage $V_S$ is set to a level equal to or more than the constant voltage in the drive circuit.

The operation of the control circuit 30 is now explained. When the electrodeless discharge lamp lighting device 3 is started at t1, the lighting detection circuit 308c provides the voltage $V_S$ at the High level. Thereby, the output current $I_{CC}$ of the control circuit 30 is fixed to zero until the electrodeless discharge lamp is lit, and the voltage of the induction coil and the detection voltage $V_{DV}$ of the voltage detection circuit are raised through the operation of the start circuit.

After this operation, the detection voltage $V_{DV}$ exceeds the threshold voltages $V_{TH1}$ and $V_{TH2}$. When the detection voltage $V_{DV}$ exceeds the threshold voltage $V_{TH1}$, it is confirmed that the operation of the start circuit is normal. The voltage $V_S$ then drops to the Low level at a point in time t2 at which the detection voltage $V_{DV}$ drops below the threshold voltages $V_{TH1}$ and $V_{TH2}$. Accordingly, immediate after the electrodeless discharge lamp is lit successfully, the frequency $f_{TO}$ is shifted to the frequency $f_{TOS}$. Though the operating frequency $f_{OP}$ then sweeps from the frequency $f_{TOS}$ to the end frequency $f_E$ side, the current $I_{VF}$ is increased by the current $I_{CC}$ during the period of time T1, so that the drive frequency $f_{OP}$ stops sweeping at a frequency higher than the end frequency $f_E$. The lighting detection circuit 308c then provides the voltage $V_S$ at the High level at t3. The succeeding operation is the same as that of the first embodiment.

In this embodiment, since it is possible to prevent the drive frequency $f_{OP}$ from reaching the end frequency $f_E$ after the electrodeless discharge lamp is lit successfully, stress on a circuit(s) can be preferably reduced.

Figure 11:
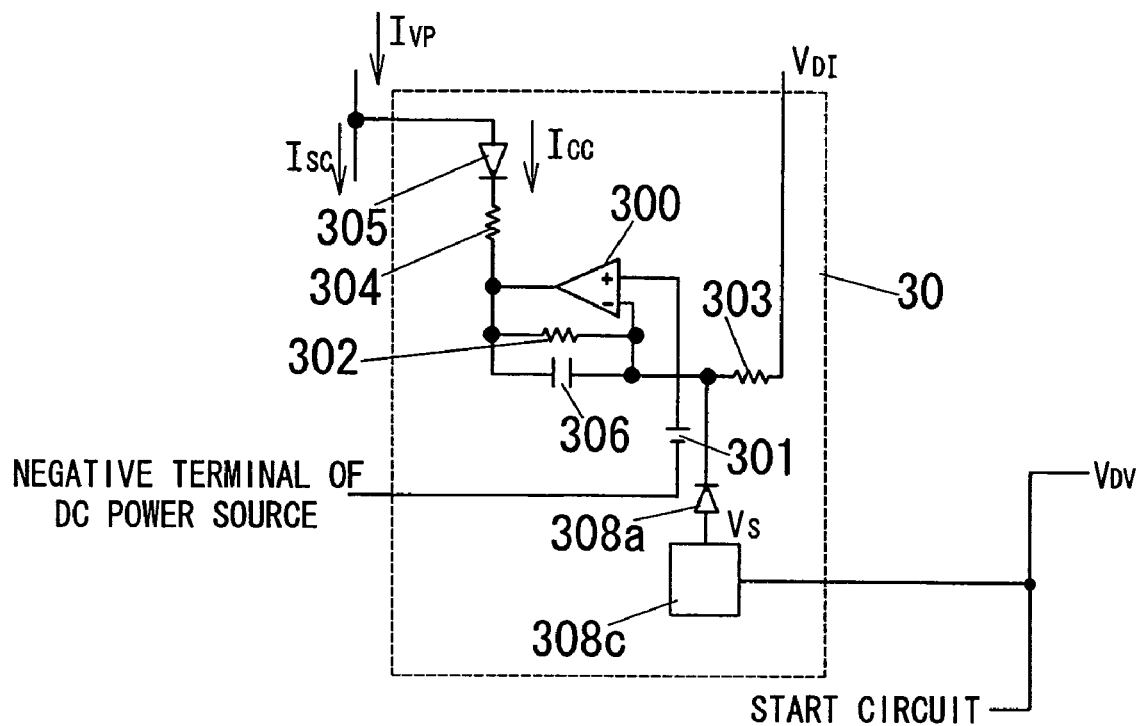
FIG. 11 is a circuit diagram showing a part of an alternate embodiment with respect to the electrodeless discharge lamp lighting device of FIG. 8.
Figure 12:
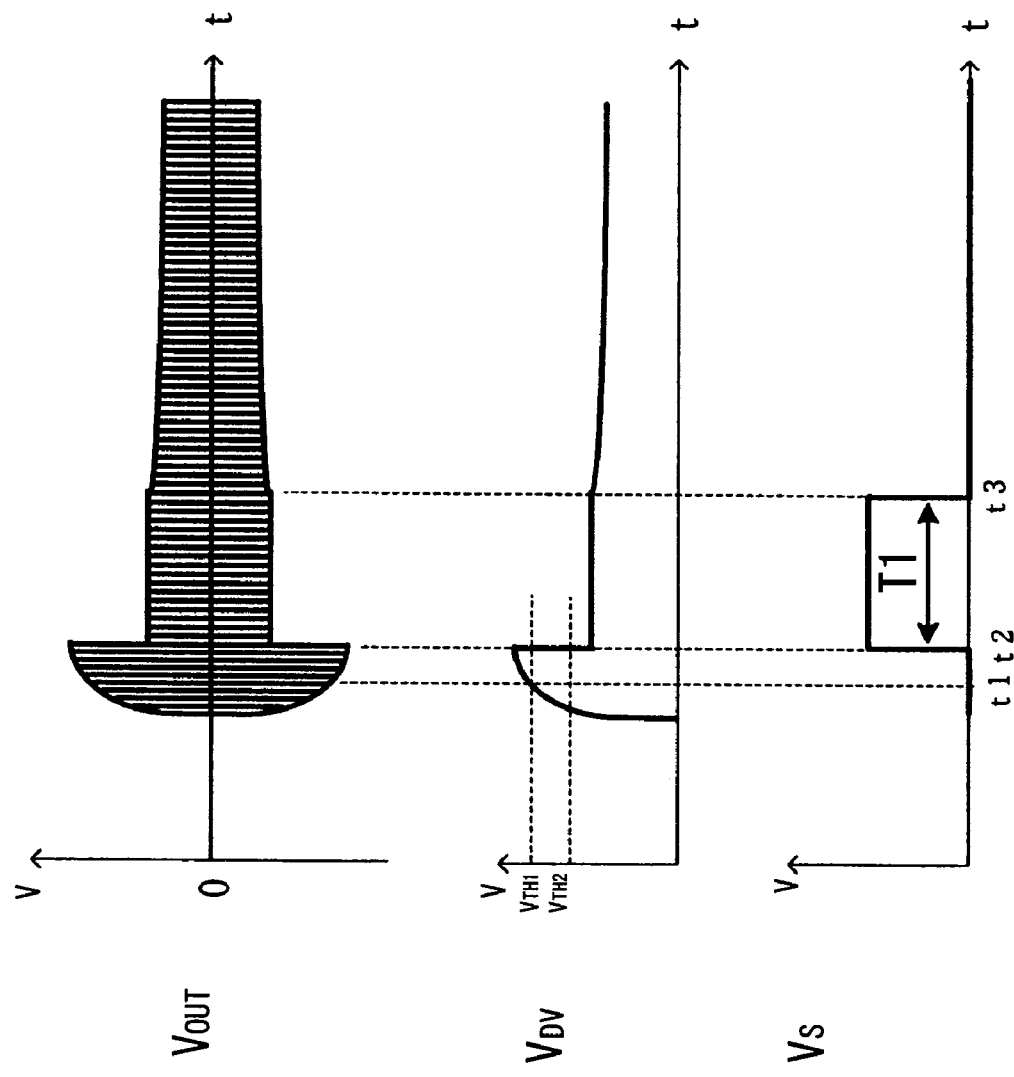
FIG. 12 is a timing chart showing an operation of the electrodeless discharge lamp lighting device of FIG. 11.

In an alternate embodiment, the control circuit 30 as shown in FIG. 11 further comprises the diode 308a and the lighting detection circuit 308c as compared with the first embodiment. The cathode of the diode 308a is connected to the inverting input terminal of the OP amp 300, while its anode is connected to the output of the lighting detection circuit 308c. The diode 308a as shown in FIG. 12 operates as a switch that receives the voltage $V_S$ from the lighting detection circuit 308c and applies the voltage $V_S$ to the output terminal of the OP amp 300 when the voltage $V_S$ is the High level. The lighting detection circuit 308c is configured to: provide the voltage $V_S$ usually at the Low (zero) level from t1; detect lighting of the electrodeless discharge lamp when the detection voltage $V_{DV}$ from the voltage detection circuit drops below the threshold voltages $V_{TH1}$ and $V_{TH2}$ after previously exceeding them; and raise the voltage $V_S$ to the High level during only the prescribed period of time T1 from time of the lighting. The High level of the voltage $V_S$ is set so that the output current $I_{CC}$ in the period of time T1 becomes a prescribed level as well as $I_{CC}$ of FIG. 9.

Figure 13:
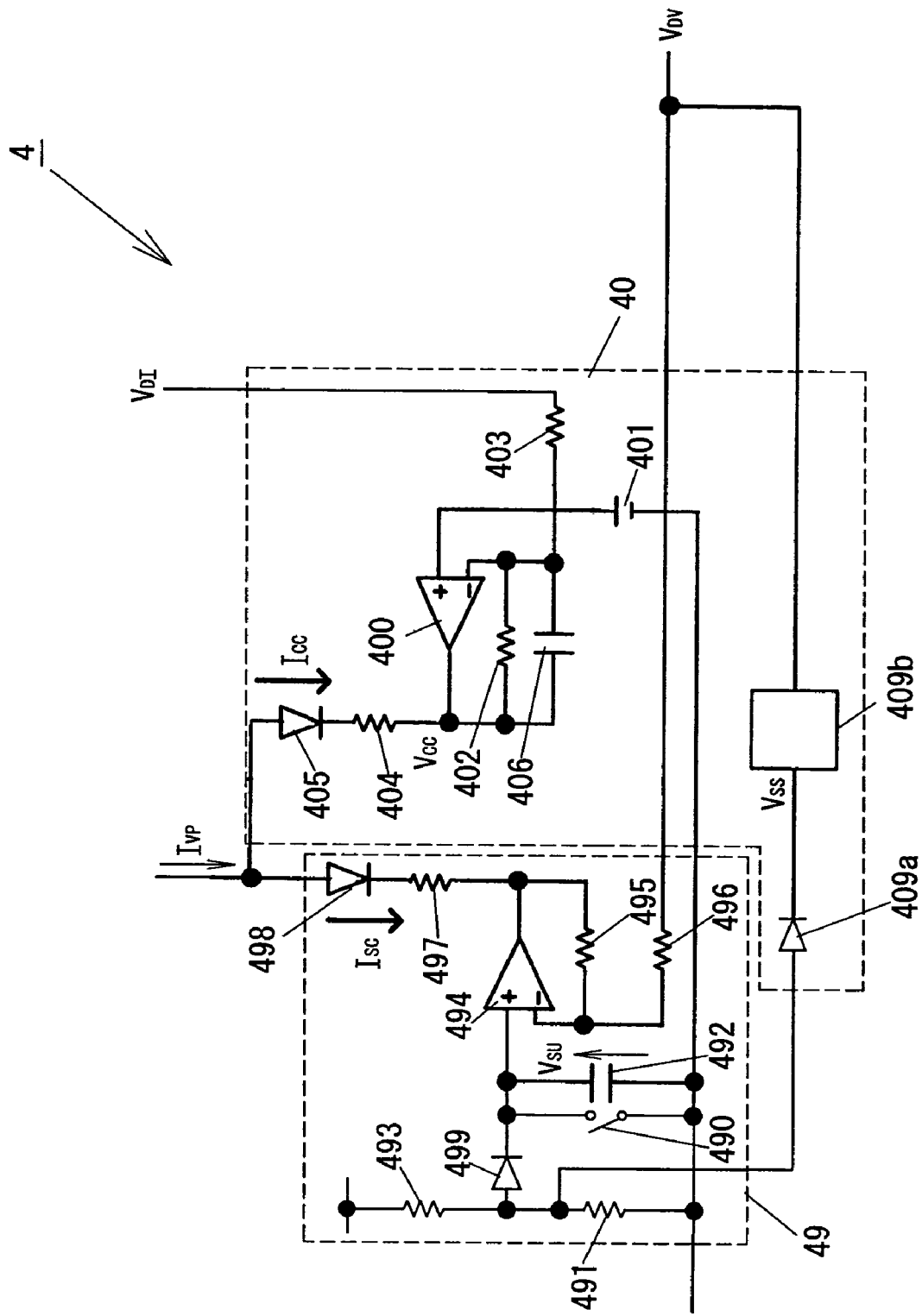
FIG. 13 is a circuit diagram showing a part of a fourth embodiment of an electrodeless discharge lamp lighting device according to the invention.

FIG. 13 shows a part of a fourth embodiment of an electrodeless discharge lamp lighting device 4 according to the invention.

The electrodeless discharge lamp lighting device 4 is characterized by mainly a control circuit 40, and is different from the first embodiment in that a start circuit 49 further comprises a diode 499 and the control circuit 40 further comprises a diode 409a and a sweep stop circuit 409b.

The start circuit 49 comprises a reference resistor 491, a capacitor 492, a thermal sensitive resistor 493, an OP amp 494, a feedback resistor 495, an input resistor 496, an output resistor 497 and a diode 498 as well as the first embodiment. A switch 490 is connected in parallel with the capacitor 492. An anode of the diode 499 is connected between the reference resistor 491 and the thermal sensitive resistor 493, while its cathode is connected to the non-inverting input terminal of the OP amp 494.

The control circuit 40 comprises an OP amp 400, a reference power source 401, a feedback resistor 402, an input resistor 403, an output resistor 404, a diode 405 and a capacitor 406 as well as the first embodiment. An anode of the diode 409a is connected between the reference resistor 491 and the thermal sensitive resistor 493, while its cathode is connected to an output terminal of the sweep stop circuit 409b. The diode 409a operates as a switch that receives a voltage $V_{SS}$ from the sweep stop circuit 409b and applies the voltage $V_{SS}$ between the reference resistor 491 and the thermal sensitive resistor 493 when the voltage $V_{SS}$ is a Low level.

Figure 14:
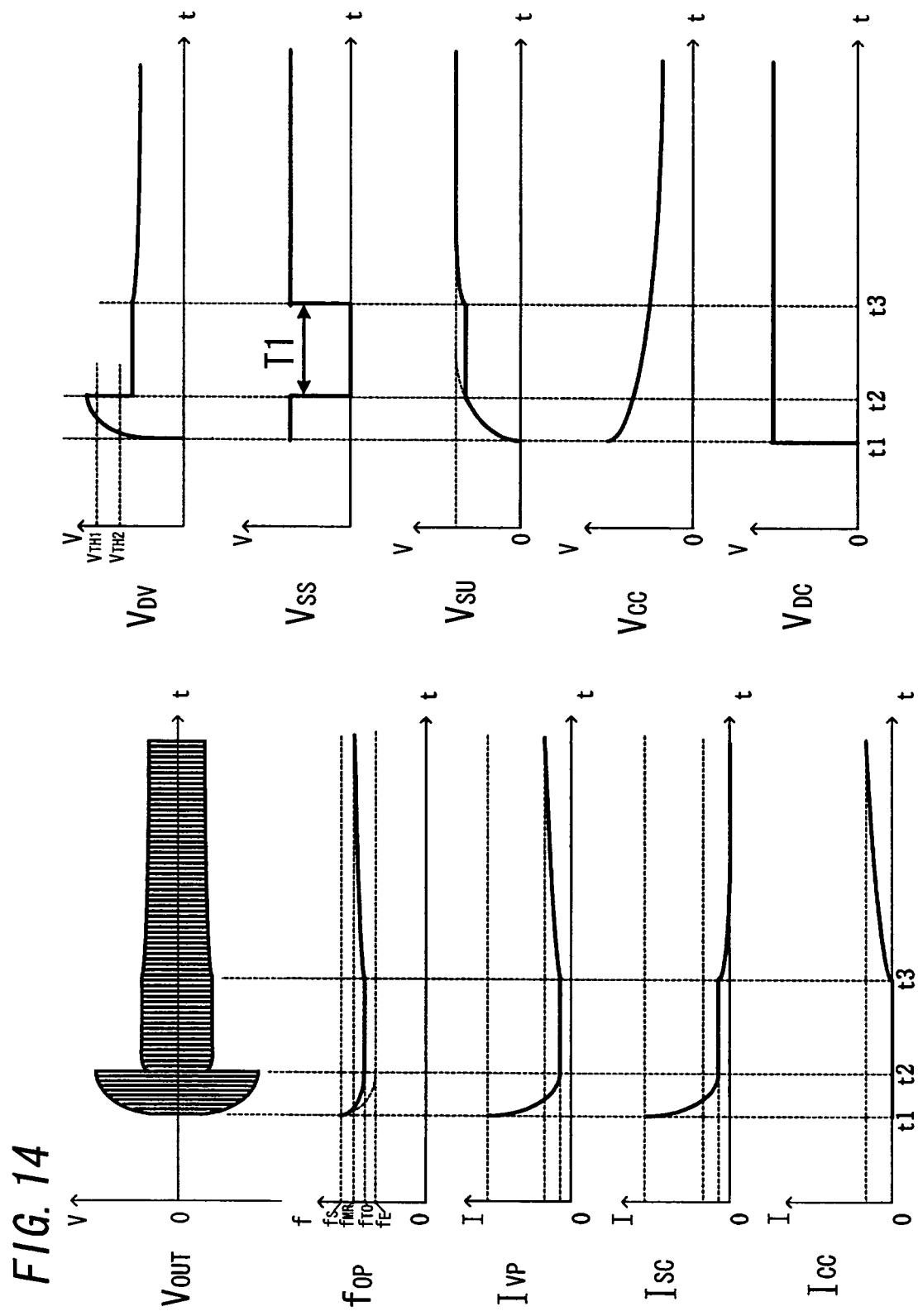
FIG. 14 is a timing chart showing an operation of the electrodeless discharge lamp lighting device of FIG. 13.
Figure 15:
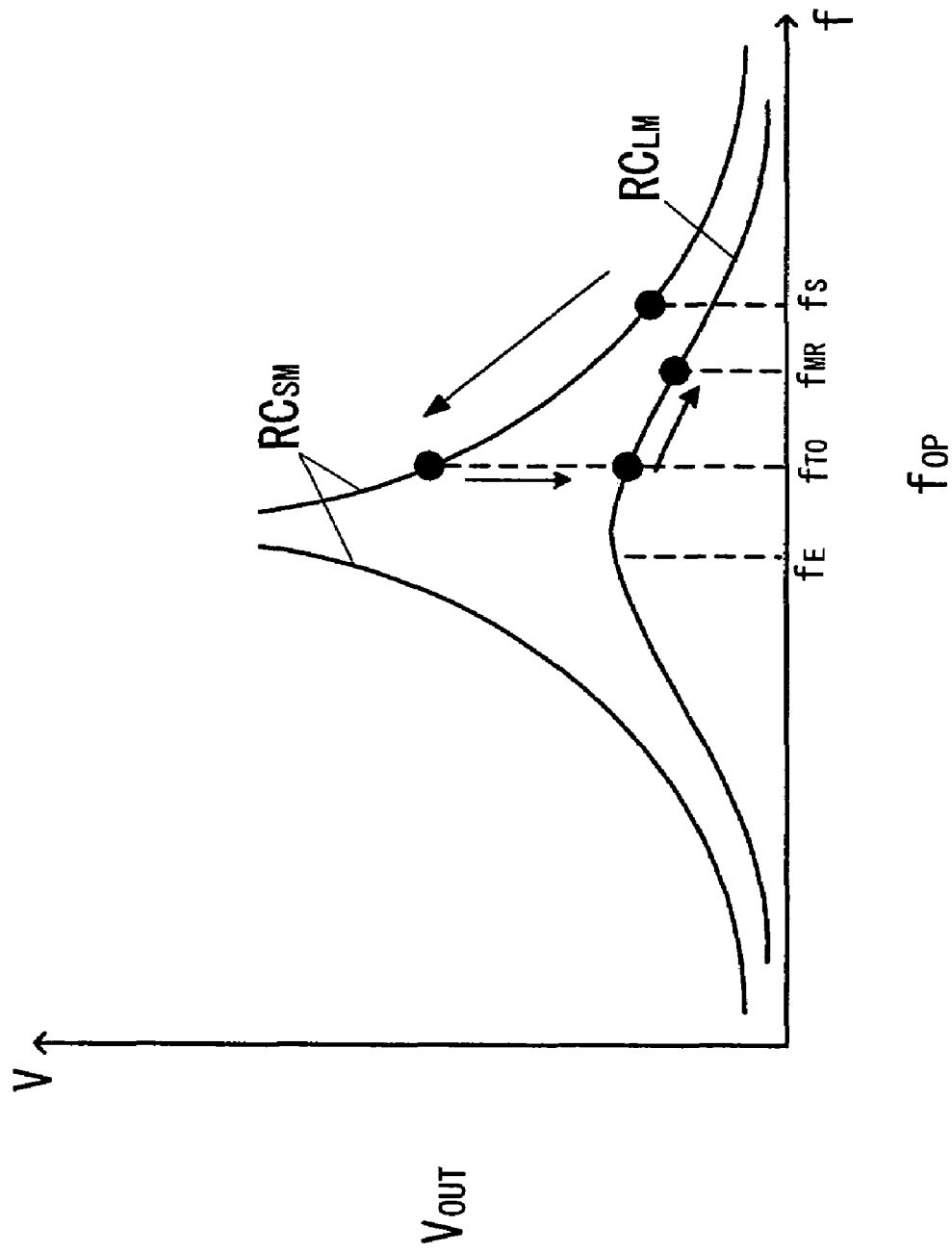
FIG. 15 is a diagram showing a resonance characteristic of the electrodeless discharge lamp lighting device of FIG. 13.

As shown in FIG. 14, the sweep stop circuit 409b is configured to: provide the voltage $V_{SS}$ usually at a High level from t1; detect lighting of the electrodeless discharge lamp when the detection voltage $V_{DV}$ from the voltage detection circuit drops below the prescribed threshold voltages $V_{TH1}$ and $V_{TH2}$ after previously exceeding them; and drop the voltage $V_{SS}$ to the Low (zero) level during only a prescribed period of time T1 from time of the lighting. Namely, as shown in FIGS. 14 and 15, the sweep stop circuit 409b stops the operation of the sweep-up circuit in the start circuit 49 at t2 to stop the sweep down of the operating frequency $f_{OP}$ at the frequency $f_{TO}$. The High level of the voltage $V_{SS}$ is set to a level equal to or more than the reference voltage of the reference resistor 491.

The operation of the control circuit 40 is now explained. When the electrodeless discharge lamp lighting device 4 is started at t1, the sweep stop circuit 409b provides the voltage $V_{SS}$ at the High level. Accordingly, the diode 409a is held off, and the start circuit 49 operates as well as the operation of the first embodiment.

After this operation, the detection voltage $V_{DV}$ exceeds the threshold voltages $V_{TH1}$ and $V_{TH2}$. The voltage $V_{SS}$ then drops to the Low level at a point in time t2 at which the detection voltage $V_{DV}$ drops below the threshold voltages $V_{TH1}$ and $V_{TH2}$. Thereby, since a current flowing from the thermal sensitive resistor 493 to the capacitor 492 sinks in the diode 409a side, the operation of the sweep-up circuit in the start circuit 49 (charge of the capacitor 492) is stopped and the sweep down of the operating frequency $f_{OP}$ is stopped at the frequency $f_{TO}$.

At t3 after this operation, the sweep stop circuit 409b provides the voltage $V_{SS}$ at the High level, while the sweep-up circuit restarts operation at the same time. Just then, since the voltage $V_{SC}$ provided from the start circuit 49 becomes lower than the voltage $V_{CC}$ provided from the control circuit 40 through the operation stop of the sweep-up circuit, the current $I_{SC}$ sweeps down until the voltage $V_{SC}$ equals the voltage $V_{CC}$. The succeeding operation is the same as that of the first embodiment.

In this embodiment, since it is possible to prevent the drive frequency $f_{OP}$ from reaching the end frequency $f_E$ after the electrodeless discharge lamp is lit successfully, stress on a circuit(s) can be preferably reduced.

Although the present invention has been described with reference to certain preferred embodiments, numerous modifications and variations can be made by those skilled in the art without departing from the true spirit and scope of this invention.

The invention claimed is:

1. An electrodeless discharge lamp lighting device, comprising:
   a DC/AC conversion circuit that converts DC power into high frequency power in response to a drive signal with a drive frequency, said high frequency power having an operating frequency corresponding to the drive frequency;
   a resonance circuit that has a resonance characteristic and receives said high frequency power to provide high frequency power varying in response to said operating frequency based on the resonance characteristic, said resonance characteristic being a characteristic in which a first resonance curve with a resonance peak at a prescribed resonance frequency in a start mode is shifted to a second resonance curve lower than the first resonance curve in a lighting mode, said start mode being a mode before an electrodeless discharge lamp lights, said lighting mode being a mode while the electrodeless discharge lamp is lighting;
   an induction coil that: generates high frequency electromagnetic field in response to the high frequency power provided through said resonance circuit; and induces high frequency power to said electrodeless discharge lamp by applying the high frequency electromagnetic field to said electrodeless discharge lamp;
   a voltage detection circuit that detects a voltage applied to said induction coil by the high frequency power from said resonance circuit and then provides a detection voltage;
   a drive circuit that provides said DC/AC conversion circuit with said drive signal having the drive frequency while adjusting the drive frequency in response to variable power; and
   a start circuit that, when said electrodeless discharge lamp is started, sweeps down or up said variable power so as to sweep said detection voltage while sweeping down said operating frequency from a prescribed start frequency higher than said resonance frequency to a prescribed end frequency lower than the start frequency;
   wherein said electrodeless discharge lamp lighting device further comprises:
   a current detection circuit that detects a current flowing through said resonance circuit to provide a detection current;
   a control circuit that increases or decreases said variable power so that said detection current comes to equal a prescribed current for shifting said operating frequency to a middle range frequency between said start frequency and said end frequency, said prescribed current being set so that said detection voltage in case of the middle range frequency becomes lower than that in case of the end frequency; and
   a suppression means that starts suppression of said control circuit's operation when said electrodeless discharge lamp is started, and then holds the suppression during at least said start mode.

2. The electrodeless discharge lamp lighting device of claim 1, wherein:
said drive circuit adjusts said drive frequency in response to increase or decrease of a current of said variable power;
said starting circuit sweeps down or up the current of said variable power so as to sweep said detection voltage while sweeping down said operating frequency from said start frequency to said end frequency;
said control circuit comprises an error amplification circuit that increases or decreases the current of said variable power so that said detection current comes to equal said prescribed current; and
said suppression means brings said current from said error amplification circuit to said drive circuit to zero or a prescribed level during at least said start mode.

3. The electrodeless discharge lamp lighting device of claim 2, wherein:
said error amplification circuit comprises an operational amplifier with a non-inverting input terminal, an inverting input terminal and an output terminal, wherein the operational amplifier receives a reference voltage equivalent to said prescribed current and a detection voltage equivalent to said detection current at the input terminals, and then increases or decreases the current of said variable power so that the detection voltage equivalent to the detection current comes to equal the reference voltage; and
said suppression means constitutes an integration circuit that is connected between one input terminal of said input terminals and said output terminal, said integration circuit having a time constant that is set to a value greater than a value equivalent to a period of time of at least said start mode.

4. The electrodeless discharge lamp lighting device of claim 2, wherein:
said error amplification circuit comprises an operational amplifier with a non-inverting input terminal, an inverting input terminal and an output terminal, wherein the operational amplifier receives a reference voltage equivalent to said prescribed current and a detection voltage equivalent to said detection current at the input terminals, and then increases the current of said variable power so that the detection voltage equivalent to said detection current comes to equal the reference voltage after said suppression means releases said suppression; and
said suppression means adjusts said reference voltage so that an output current of said operational amplifier substantially comes to equal zero during at least said start mode.

5. The electrodeless discharge lamp lighting device of claim 2, wherein said drive circuit is substantially controlled with only said control circuit after said operating frequency reaches said end frequency.

6. The electrodeless discharge lamp lighting device of claim 2, wherein said end frequency is set to a frequency in proximity to a peak of said second resonance curve.

7. The electrodeless discharge lamp lighting device of claim 2, wherein said starting circuit comprises:
a sweep circuit that provides a sweep voltage sweeping up or down from a point in time at which said electrodeless discharge lamp is started; and
an operational amplifier with a non-inverting input terminal, an inverting input terminal and an output terminal, wherein the operational amplifier receives said detection voltage from said voltage detecting circuit and said sweep voltage at the input terminals, and then decreases or increases the current of said variable power so that the detection voltage comes to equal the sweep voltage.

8. A luminaire, comprising the electrodeless discharge lamp lighting device and the electrodeless discharge lamp of claim 1.

* * * * *